United States Patent [19]
Lyon et al.

[11] 3,885,929
[45] May 27, 1975

[54] METHOD AND APPARATUS FOR CLEANING EXHAUST GAS

[75] Inventors: Richard S. Lyon, Carroll, Ohio;
Ralph L. Lyon, Wheaton, Ill.

[73] Assignee: United McGill Corporation, Columbus, Ohio

[22] Filed: Oct. 26, 1973

[21] Appl. No.: 410,206

Related U.S. Application Data

[62] Division of Ser. No. 171,686, Aug. 13, 1971, Pat. No. 3,789,109.

[52] U.S. Cl............. 55/87; 23/277 C; 55/94; 55/95; 55/223; 55/227; 55/233; 55/250; 55/259; 55/518
[51] Int. Cl............................................. B01d 47/02
[58] Field of Search ....... 55/71, 84, 87, 518, 90–95, 55/223, 227, 228, 233, 259, 240, 249, 250; 261/98, 116, 117; 23/284, 277 C

[56] References Cited
UNITED STATES PATENTS

| | | | |
|---|---|---|---|
| 1,493,579 | 5/1924 | Walter | 55/94 |
| 3,268,296 | 4/1966 | Hall et al. | 55/71 |
| 3,522,692 | 8/1970 | Brookman et al. | 55/233 |
| 3,667,191 | 6/1972 | Prince et al. | 55/87 |
| 3,704,570 | 12/1972 | Gardenier | 23/277 C |
| 3,710,551 | 1/1973 | Sved | 55/249 |
| 3,713,277 | 1/1973 | Sackett, Sr. | 55/223 |
| 3,789,585 | 2/1974 | Arnold et al. | 55/228 |

*Primary Examiner*—Bernard Nozick
*Attorney, Agent, or Firm*—Strauch, Nolan, Neale, Nies & Kurz

[57] ABSTRACT

A system for cleaning air polluted, for example, with metallic chlorides and hydrogen chloride gas. The air is heated to convert the metallic chlorides to metallic oxides and hydrogen chloride gas and then conveyed to a gas scrubber. Before entering the scrubber, fresh water is sprayed into the air to rapidly cool the air and the water reacts with the hydrogen chloride gas to form hydrochloric acid. The scrubber employs water to wash and scrub the air and remove the pollutants from the air.

51 Claims, 12 Drawing Figures

METHOD AND APPARATUS FOR CLEANING EXHAUST GAS

This application is a division of application Ser. No. 171,686 filed Aug. 13, 1971 issued Jan. 29, 1974 now U.S. Pat. No. 3,789,109.

BACKGROUND OF THE INVENTION

This invention relates generally to method and apparatus for cleaning a contaminated gas and, more particularly, to method and apparatus for cleaning air contaminated with solid, liquid, and/or gaseous pollutants derived from a hot-end coating station of a glass article manufacturing facility.

The invention was especially developed for treating the exhaust gases from a hot-end coating station in a glass bottle manufacturing operation. When filling glass bottles with beverages, or the like, at high rates or speed, the bottles may be handled very roughly and may be subjected to excessive impact forces as they are bounced around, thus causing some of the bottles to break or crack. As a result, most of previously known bottle filling operations could only proceed at a rate of about 150–200 bottles per minute without encountering any unsurmountable breakage difficulties. However, in order for bottles to effectively complete with other types of containers, such as cans, it is desirable that bottles be filled at a rate of about 1000 bottles per minute. At that high rate of filling the bottles are handled very rapidly, are subjected to rough treatment and frequently are incapable of withstanding the impact of the blows imposed upon them. Consequently, the number of bottles broken or cracked during filling us unacceptably high. Furthermore, broken bottles cause work stoppage which are costly.

To solve this problem it has been proposed to coat the glass bottles with an external metallic coating which reduces the scratching and chipping of the bottles. Since most of the strength of thin wall bottles can be lost by a scratch, the coating imparts overall strength and stability to the bottles and enables them to withstand the high impact blows which may occur at the high rate of filling. The coating step is performed during the bottle manufacturing operation as the bottles pass from a bottle forming station to an annealing lehr. At the coating step stage of the operation, the formed bottles are at a temperatures of about 800°–900°F. As they pass through a hood located at the coating station, a metallic chloride spray, preferably anhydrous stannic chloride ($SnCl_4$), a liquid of low vapor pressure, is sprayed on the bottles. The anhydrous stannic chloride ($SnCl_4$) will be in vapor and/or droplet form, with the droplets being 0.4 to 0.6 microns in size. Because of the high temperature of the bottles, the $SnCl_4$ vapor and/or droplets contacting the bottles are burned to provide a stannic oxide ($SnO_2$) coating on the external surface of the bottles. This $SnO_2$ coating substantially increases the impact strength of the bottles and consequently enables a subsequent bottle filling operation to proceed at a high rate, competitive with that of other containers such as cans.

While the coating step increased the strength of the bottles, unfortunately, it also creates undesirable dangerous pollution problems in the overall bottle manufacturing operation. A substantially precent of the $SnCl_4$ spray does not adhere to the bottles but passes through the coating hood and is subsequently carried away by an air exhaust stream. In addition, the $SnCl_4$ successfully coated on the hot bottles as $SnO_2$ also generates hydrogen chloride gas (HCl gas) as a reaction product which is removed in the exhaust stream. Thus, exhaust air from the coating station cannot simply be emitted into the atmosphere surrounding the bottle manufacturing facility because of the large amount of anhydrous stannic chloride ($SnCl_4$) vapor and the HCl gas entrained therein, the latter of which reacts with water vapor or droplets to form hydrochloric acid. In addition, once the anhydrous stannic chloride vapor is in the atmosphere, the stannic chloride forms the hydrate, settles, and is slowly hydrolyzed to hydrated stannic oxides and hydrocchloric acid which is corrosive and reacts with the surface of the material on which it settles or adheres to. The stannic oxide hydrates formed also act as suitable surfaces for absorbing water vapor, thus retaining the hydrochloric acid formed in a concentrated form, similar to the manner in which dust forms the core in the formula of rain drops. This problem is greatly intensified on days when the relative humidity in the atmosphere is high.

To alleviate the aforedescribed pollution problems, it is necessary to treat the polluted air exhausted from the coating hood to remove the solid and gaseous contaminants therefrom before the air is emitted into the atmosphere. Prior to the development of the method and apparatus of this invention, there was no known feasible and economical system available for perfoming the task satisfactorily within the requirements established by industrial and governmental pollution control standards.

SUMMARY OF THE INVENTION

Accordingly, the primary object of this ivention resides in the provision of novel method and apparatus for treating a polluted gas, such as air, to remove undesirable contaminants therefrom.

Another object of this invention resides in the provision of novel, efficient and practical method and apparatus for removing solid, liquid, and/or gaseous contaminants from air, the method and apparatus employing water wash principles according to which the air is scrubbed by water or a water containing liquor to remove the contaminants therefrom. In addition, wetting and defoaming agents are added to the water to significantly improve the scrubbing action of the system.

Still another object of the invention resides in the provision of a novel method and apparatus for cleaning polluted air, particularly the air exhausted from a hot-end glass coating station at which hot glass articles are sprayed with a metallic chloride such as $SnCl_4$.

A further object of this invention resides in the provision of novel method and apparatus as described in the previous object, wherein the exhaust air, immediately upon passage from the coating hood, is heated to a temperature sufficient to convert the entrained stannic chloride, present in the anhydrous form as well as the hydrate forms ($SnCl_4 \cdot xH_2O$) resulting from hydration by water vapor present in the exhaust stream, to $SnO_2$ particles, $H_2O$ vapor, and HCl gas. The air and its entrained contaminants are then conveyed through a heat insulated duct to a scrubber apparatus in which the contaminants are removed before the air is emitted into the atmosphere. The overall method and apparatus are very efficient and dependable, relatively simple in operation with few moving parts, and are within economic feasibilites.

A still further object resides in the provision of a novel, water-wash, swirl orifice type scrubber advantageously employed in the method and apparatus discussed in the above objects, but also having a more general utility in other gas scrubbing operations. The scrubber, in addition to the self-induced water wash principle, employs a novel combination of elements including orifice deflector plates, a final scrubber pad, a demister pad, and various fresh water spray nozzles, strategically located within the scrubber to effect a thorough and efficient scrubbing of the gas as it passes therethrough before being emitted into the atmosphere.

Other objects and advantages of the invention will become more readily apparent from reading the detailed description of the invention which follows as it is related to the specific embodiment illustrated in the drawings, wherein like elements are designated by like numerals throughout.

DETAILED DESCRIPTION OF THE INVENTION

Figure 1:
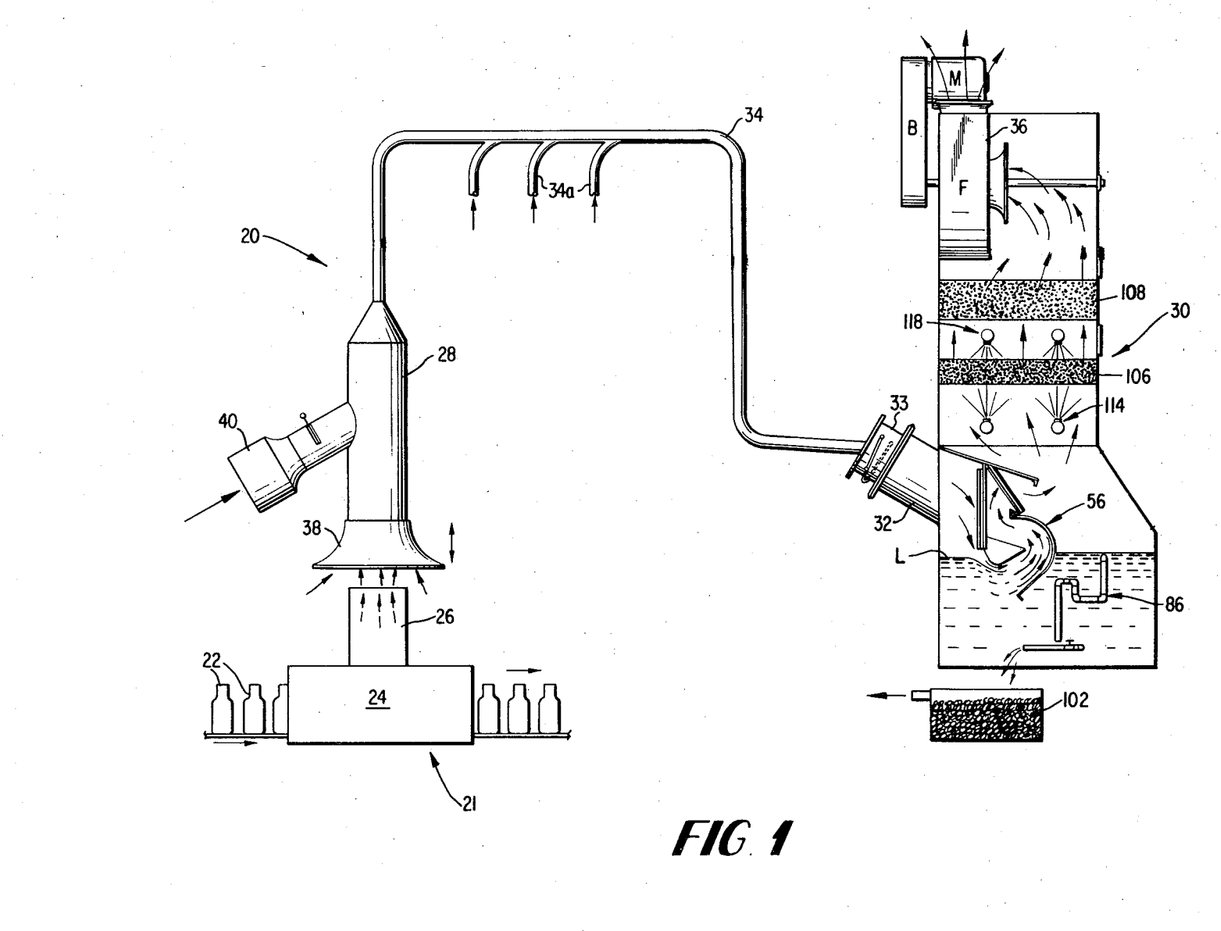
FIG. 1 is a schematic illustration of the overall scrubbing system of the invention as it is employed in combination with a hot-end coating station in a glass manufacturing facility, at which station hot glass bottles are provided with an external metallic coating.

Referred now to FIG. 1, the exhaust scrubbing system 20 of the invention is shown in use with a hot end coating station 21 positioned along one of the production lines of a glass bottle manufacturing facility. As the bottles 22 are conveyed from a forming station to an annealing lehr, they pass through a coating hood 24 wherein a metallic chloride, preferably anhydrous $SnCl_4$ mist of 0.4 to 0.6 microns in diameter, is sprayed against the external surfaces of the bottles. Because the bottles are at the temperature of about 800°–900°F, the $SnCl_4$ reacts at the surface of the bottles to form a $SnO_2$ coating on the bottles and at the same time release hydrogen chloride gas (HCl gas) which is carried away in an air exhaust stream.

Scrubbing system 20 generally comprise a gas collection assembly including hood 24, its vertical standpipe 26 and an enlarged gas collection conduit 28 mounted above hood 24. A swirl orifice type scrubber 30 has a gas inlet duct 32, the outer end of which has a fresh water spray duct 33 flange connected thereto, and conduit 28 is connected to spray duct 33 by a heat insultated duct 34. In FIG. 1, conduit 28 and ducts 32, 33, and 34 are shown schematically. In practice, conduit 28 may be 8 inches in diameter, ducts 34, 33, and 32 may be about 6 inches, 11 inches and 12 inches in diameter, respectively.

Scrubber 30 also includes a fan 36 mounted at its upper end. The fan creates the exhaust stream of air which flows in the open ends of hood 24 and out through standpipe 26 into conduit 28, and from conduit 28 through ducts 34, 33 and 32 into scrubber 30 wherein the air is cleaned before being exhausted via the housing of fan 36. It should be particularly noted that the fan 36 and its drive assemby are the only mechanically moving parts in scrubber system 20. Consequently, the system requires a minimum of maintenance over long periods of usage.

The volume rate of flow of air through hood 24 is variagle by vertically adjusting a bell-mouth fittings 38, mounted on the lower end of conduit 28, relative to the hood stand pipe 26. This adjustment also varies the amount of induced air flow created between the lower end of fitting 38 and the upper end of standpipe 26. In a prototype of the invention constructed for experimental purposes, wherein scrubber 30 had a capacity of about 3000 SCFM (Standard Cubic Feet Per Minute), fitting 38 was postioned to produce an exhaust air stream of 250–300 SCFM through hood 24 and a total air flow within the lower portion of conduit 28 of about 500 SCFM.

it has been found that the anhydrous $SnCl_4$ vapors or droplets entrained in the exhaust air stream collected from hood 24 are very difficult to separate or retain in scrubber 30, primarily because of the low vapor pressure of anhydrous $SnCl_4$, i.e., lack of affinity of the molecules for one another, and the brief residence time in the scrubber which probably does not permit the less volatile hydrates to be formed. Consequently, the vapors and droplets do not tend to aggiomerate into larger aggregates which could be more easily removed by scrubber 30.

To alleviate this problem a gas burner 40 is mounted on the side of conduit 28 and injects a raw gas flame directly into the conduit. The exhaust air is thereby heated to a temperature high enough to initiat the following chemical reaction:

$$SnCl_4 + (x+2)H_2O \rightleftarrows SnO_2\downarrow + H_2O\uparrow + 4HCl\uparrow$$

The $SnCl_4$ will be in vapor or droplet form, the $SnO_2$ will be in solid particle form, and the HCl will be in gaseous form, and the $SnCl_4$ must be heated to a temperature above 350°F.

In the prototype, it was found that the air preferably should be heated to a temperature of at least 500°F to produce the above chemical reaction and to ensure that the hydrogen chloride is maintained in its gaseous state as the air passes through duct 34 to scrubber 30. The heat insulating duct 34 preferably includes an inner stainless steel pipe surrounded by an outer galvanized pipe, with a layer of heat insulating material positioned between both pipes. Such a pipe construction ensures that the temperature of the air passing through the duct is kept high so that HCl acid is not formed in the duct, thereby substantially eliminating any corrosion problems in the duct. As the air leaves duct 34 and enters the spray duct 33, it preferably should be at a temperature of about 350°-400°F so that the HCl is still in a gaseous state. In passing through spray duct 33, the air is rapidly cooled to a temperature of about 140°-160°F before entering scrubber 30.

The heating of the air stream by burner 40 is beneficial in another respect. Without the heating step, the anhydrous $SnCl_4$ in the air stream passing through duct 34 may form the stannic chloride hydrates, which will settle in the duct and hydrolyze to hydrated stannic oxides and hydrochloric acid. Consequently, solids and semi-solids would tend to collect on the walls of the duct and the hydrochloric acid would corrode the duct. The heat from burner 40 avoids these problems.

Before proceeding to the description of the scrubber 30, it should be noted that duct 34 may be connected by branch conduits 34a to additional coating stations 21 so that a single scrubber 30 may be used to treat the exhaust air from a plural number of coating stations located along the several production lines which generally are included in a bottle manufacturing facility.

Figures 2, 12:
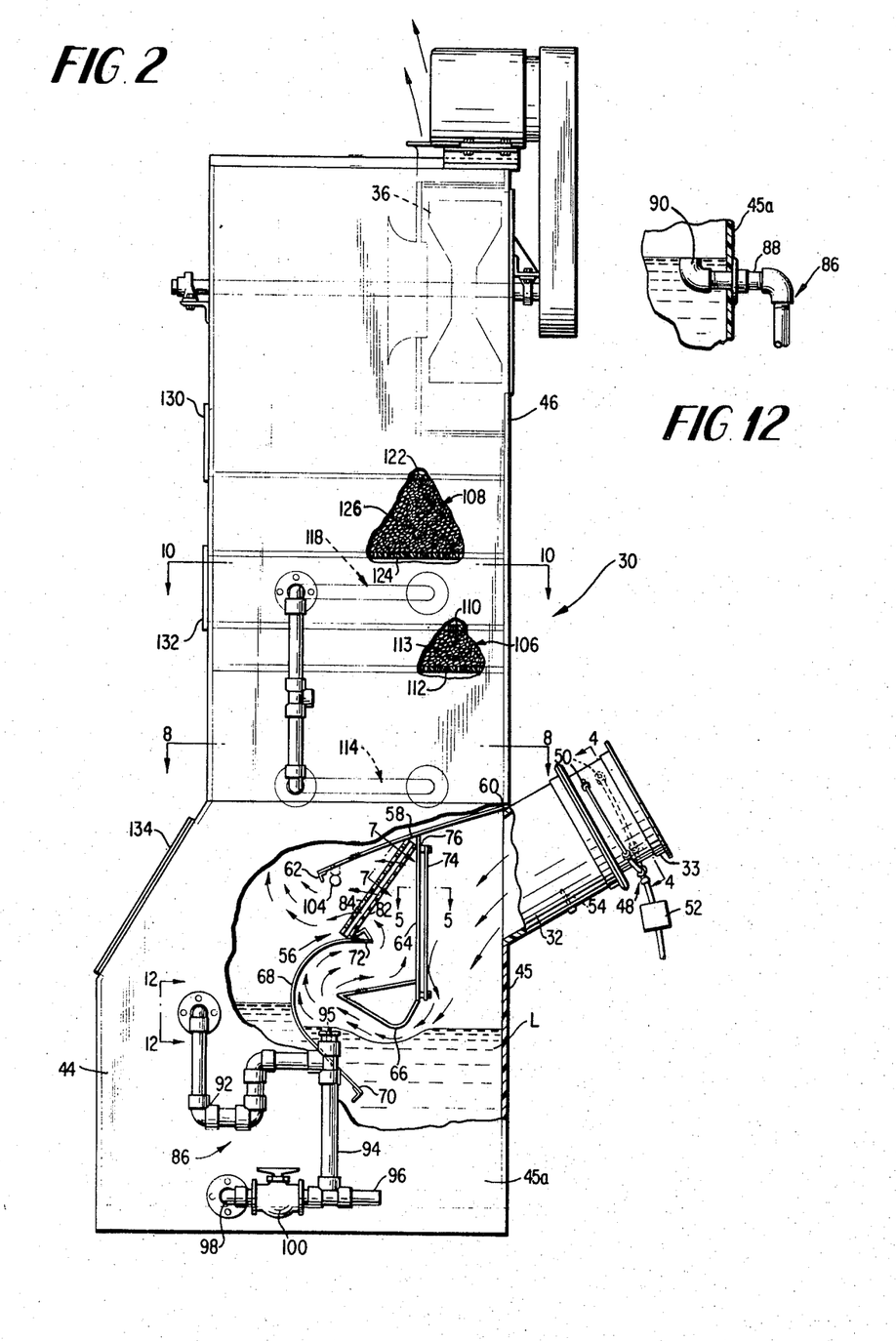
FIG. 2 is an enlarged right side elevation view of the novel swirl orifice type scrubber employed in the invention, with the side wall partially broken away to clearly illustrate the scroll baffle arrangement and the liquid bath located within the lower section of the scrubber.
FIG. 12 is a fragmentary sectioanl view, taken along line 12—12 of FIG. 2, illustrating the overflow pipe within the lower section of the scrubber.
Figure 3:
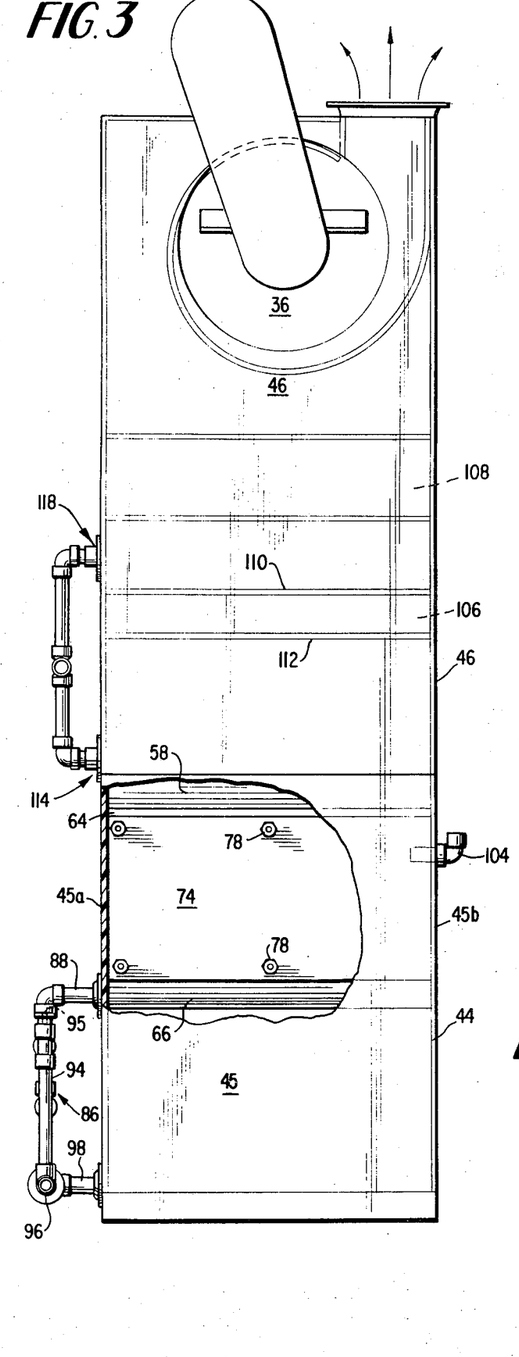
FIG. 3 is a rear elevation view of the scrubber illustrated in FIG. 2, with the air inlet duct removed and the back wall structure partially broken away to particularly illustrate the manner in which the scroll baffle arrangement extends between the two side walls of the scrubber.

Referring now to FIGS. 2 and 3, scrubber 30 includes a lower section 44, in which a liquid bath is maintained, and an upper section 46, with the walls of both sections being constructed from a corrosion and acid-resistant material, preferably rigid PVC (polyvinylchloride) plastic material or other suitable material. Inlet duct 32 is connected to and inclined downwardly toward back wall 45 of lower section 44. It also is constructed from rigid PVC plastic. In very large scrubbers, it may be necessary to construct the walls of lower section 44 of metal and to coat the interior faces of the walls with PVC plastic.

Figure 4:
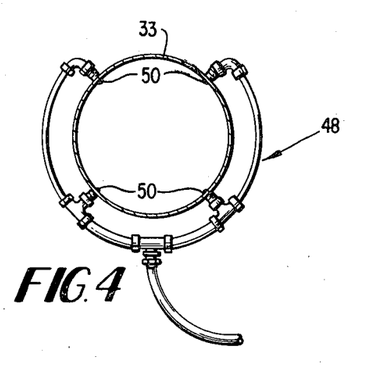
FIG. 4 is a sectional view, taken along line 4—4 of FIG. 2, illustrating the spray nozzle arrangement by which fresh water is sprayed into the air before it enters the scrubber to rapidly cool the air.

Spray duct 33 is preferably constructed of stainless steel, and, as the air enters duct 33 from duct 34 as indicated above, it is at a temperature of about 350°-400°F. A fresh water spray nozzle assembly 48 is mounted on duct 33 and includes a plurality of atomizing nozzles 50 spaced circumferentially around the duct (FIG. 4). As shown in FIG. 2, nozzles 50 are also spaced axially from each other along the axis of duct 33. Consequently, the air entering duct 33 is rapidly cooled by the continuous spray of fresh tap water injected by nozzles 50 across the entire flow path of the air, and a more efficient, progressive cooling action occurs due to the axial spacing of the nozzles.

The amount of water injected into the air stream by nozzles 50 should be enough to cool the air to about 140°-160°F so that the PVC walls of inlet duct 32 and lower section 44 of scrubber 30 are not adversely affected. In the prototype, water at a pressure of 40psi was injected at a rate of 2.5-3.0 GPM. The amount of fresh water supplied to spray assembly 48 at a constant rate may be controlled by a valve 52. As a safety feature, a temperature sensing element 54 may be provided to the temperature of the air passing through inlet 34 downstream of spray assembly 48 and when element 54 senses an excessively high air temperature, the entire scrubber system may be shut down.

The rapid cooling effect resulting from the fresh water injected by nozzles 50 also advantageously promote separation of the pollutants from the air stream. When the air stream is cooled, the HCl gas condenses to a liquid, forming HCl acid, which then falls into bath L in scrubber section 44 because of the downward incline of inlet duct 32 toward back wall 45.

The water from nozzles 50 also has a wetting effect on the minute $SnO_2$ particles entrained in the air stream and appears to promote agglomeration of the wetted particles to form larger particles which are more easily separated from the air stream within scrubber 30.

As best shown in FIGS. 2 and 3, a scroll baffle assembly 56 is fixed within lower scrubber section 44 and extends between the side walls 45a and 45b, respectively, to cause the air stream entering the scrubber from duct 32 to flow along a tortuous scroll type path as generally illustrated by the flow arrows in FIG. 2. Assembly 56 includes a downwardly inclined baffle member 58 which has one edge 60 connected to back wall 45 at a point just above inlet duct 32 and which has its other edge 62 located generally in the central region of section 44. A vertical baffle member 64 is connected to baffle member 58 at a point intermediate edges 60 and 62 in spaced relation from back wall 45. A duck-bill baffle member 66 is fixed to the lower end of member 64, and an arcuate baffle member 68 is fixed between walls 45a and 45b, with its lower end 70 spaced below member 66 within the liquid bath L and its upper horizontally extending end 72 located vertically between members 58 and 66. The baffles 58, 64, 66 and 68 are constructed from acid resistant PVC plastic.

A heat shield 74, preferably of polypropylene plastic material which has a higher breakdown temperature than PVC plastic is mounted on the rear face of baffle member 64 directly opposite inlet duct 32 to protect the PVC members 64 and 66 from heat damage which might be caused by the hot air entering the scrubber.

Figure 5:
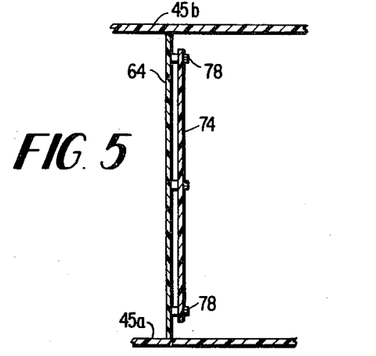
FIG. 5 is a sectional view taken along line 5—5 of FIG. 2 particularly illustrating the heat shield loosely mounted directly on the vertical baffle member of the scroll baffle arrangement.
Figure 6:
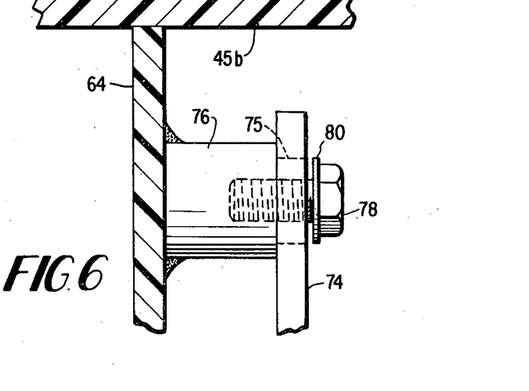
FIG. 6 is an enlarged fragmentary illustration of the manner in which the heat shield is loosely mounted on the baffle to permit free expansion and contraction of the heat shield under fluctuating air temperature conditions.

As shown in FIGS. 5 and 6, a plurality of PVC spacer bars 76 are fixed to member 64, and shield 74 has a plurality of enlarged openings 75 through which the smaller shanks of PVC bolts 78 pass to loosely mount shield 74 on spacers 76. A PVC washer 80 surrounds the shank of each bolt to prevent the shield from clearing over the head of the bolt. Because heat shield is loosely mounted on bolts 78, it is free to expand and contract in all directions and will not break or crack under varying temperature conditions as the hot air from inlet 32 impinges on it.

The air entering scrubber section 44 via inlet 32 impinges against heat shield 74 and is deflected downwardly through the upper portion of the liquid bath L. At start up, the liquid in bath L is fresh water. However, after a period of use the water has mixed in it HCl acid and solids which have been removed from the air, and additives described below.

As air passes at a high velocity beneath baffle 66 and upwardly through the passagee between baffles 66 and 68, it aspirates and entrains liquid from the upper portion of bath L. Any HCl gas remaining in the air stream reacts with entrained liquid to form hydrochloric acid and the particulate material in the air stream becomes highly wetted with the liquid.

The upper edge of arcuate baffle 68 forces the air stream to flow back toward the rear face of baffle 64, which in combination with the underside of baffle 58, again reverses the direction of air flow forcing it to pass outwardly through the passage between edge 62 of baffle 58 and edge 72 of baffle 68. The scroll baffle assembly 56 creates a great deal of turbulence and mixing in the air stream and liquid entrained therein. As a result of particle and liquid collisions, the air stream is very efficiently scrubbed and most of the contaminants are collected in bath L.

Figures 7, 8, 9, 10, 11:
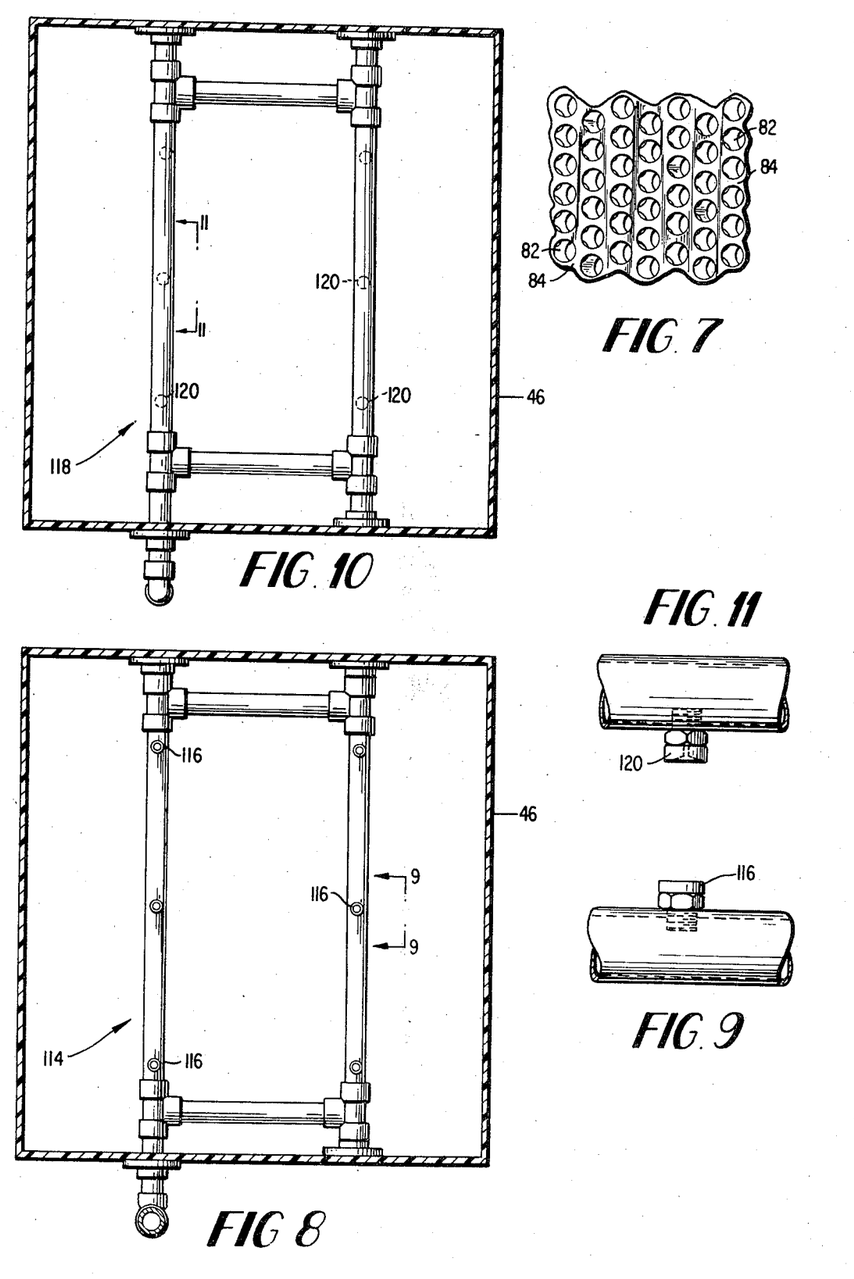
FIG. 7 is a fragmentary view taken along line 7—7 of FIG. 2 and illustrating the maner in which the openings in the front and back deflector plates are offset from each other to impart a high degree of turbulence to the air passing therethrough and to cause any particles entrained in the air to impinge upon the deflector plates and water droplets.
FIG. 8 is a sectional plan view, taken along line 8—8 of FIG. 2, illustrating the lower spray nozzle assembly by which fresh water is sprayed upwardly upon the bottom of the scrubber pad.
FIG. 9 is a fragmentary view, taken along line 9—9 of FIG. 8, showing an individual spray nozzle of the lower spray assembly illustrated in FIG. 8.
FIG. 10 is a sectional plan view, taken generally along line 10—10 of FIG. 2, illustrating the upper spray nozzle assembly which sprays fresh water downwardly upon the top of the scrubber pad.
FIG. 11 is a fragmentary view, taken along line 11—11 of FIG. 10, illustrating a single nozzle of the upper spray assembly by which fresh water is sprayed down upon the scrubber pad.

To further enhance the scrubbing action afforded by baffle assembly 56, a pair of front and rear orifice PVC plates 82 and 84, respectively, are mounted in spaced relation from each other between the upper edge 72 of baffle 68 and the intersecting corner of baffles 58 and 64. As shown in FIG. 7, the openings in front plate 82 are offset from those in plate 84. As the air passes through the plates 82 and 84, the offset openings create a venturi effect and the entrained particles impinge directly against the plates and fall back into the bath L.

When the high velocity, turbulent air stream emitted from orifice plates 82 and 84 passes around edge 62 and exits from baffle assembly 56, its velocity is reduced and an expansion effect is produced which causes any ligher, wetted particles remaining in the air stream to fall by gravity down into bath L.

The level of bath L must be closely controlled within a scubber section 44 to ensure optimum efficiency of the scrubber under operating conditions. To accomplish this, a level control PVC piping asembly 86, shown in FIGS. 2, 3, and 12, has a horizontal pipe section 88 fixed to and extending through the side wall 45a of section 44. A pipe elbow 90 is threadedly connected on the inner end of section 88 and is pivotal to adjust the position of its open end which acts as an overflow opening for bath L, thereby establishing and maintainingg the level of the bath during operation of the scrubber.

The outer end of pipe section 88 is connected to a vertical U-shaped pipe section 92 which in turn is connected to vertical pipe 94 leading to a drain conduit 96. Pipe section 94 has a small vent opening 95 at its upper end to relieve any air from the piping assembly. Pipe section 92 acts as a trap and is dimensioned to provide a head of liquid sufficient to overcome the maximum vacuum pressure which could be created in scrubber 30 by the fan 36.

A bottom drain conduit 98 is connected to the drain line 96 by way of valve 100 and enables the scrubber section 44 to be completely drained periodically for clean-out purposes.

As shown in FIG. 1, the acidic liquor drained from bath L via conduit 96 may be passed through a limestone bed 102 which neutralizes the liquor, thereby enabling the neutralized effluent to be further treated in conventional water treatment equipment that may be available in the manufacturing facility.

Another important feature which enhances the scrubbing action of the baffle assembly 56 and bath L in section 44 is the additon of a wetting agent or surfactant and a defoaming agent to bath L through a conduit 104 which extends through the side wall 45b of section 44. The wetting agent not only reduces the surface tension of the water in bath L, but it is through to also act internally on the drops of water and increase the effective size of the drops. The defoaming agent reduces the amount of foaming and frothing which occurs in bath L and section 44.

The amount of additives supplied to bath L through fitting 104 is normally very small, for example, about 0.11% by volume of bath L of a mixture of a wetting agent and defoamer may be sufficient in most instances. However, even though added in small amounts, the additives significantly improves the overall efficiency of the scrubber 30 by an amount of about 5 to 10%.

Returning now to the air flow through scurbber 30, as the air leaves the baffle assembly 56 it is drawn upwardly into section 46 by fan 36 and passes through a final scrubber pad 106 and a demister pad 108 before it exits scrubber 30 by way of the fan housing.

Scrubber pad 106 extends across the entire cross-sectional flow area of upper section 46 and is formed by upper and lower perforated polypropylene support grates 110 and 112, and an intermediate filter bed 113 of microreticulated polyester fibrous pellets packed between the grates. The pellets preferably are of the type known as E-PACK and are sold by the Beco Engineering Co.

A lower fresh water spray assemby 114 (FIGS. 8 and 9) is mounted in section 46 beneath pad 106 and includes suitable piping and a plurality of atomizing nozzles 116 which direct a continuous pressurized spray of fresh water upwardly against the bottom of pad 106.

Similarly, an upper fresh water spray assembly 118 (FIGS. 10 and 11) is mounted in section 46 above pad 106 and includes suitable piping and a plurality of atomizing nozzles 120 which direct a continuous pressurized spray of water downwardly against the top of pad 106.

As a result of spray assemblies 114 and 118, the pellets in pad 106 are highly wetted and the pad acts as a final transfer or separation stage for any contaminants remaining in the air. The water from assemblies 114 and 118 continuously washes pad 106, keeping it clean and effective as a final filtering and separating stage.

Demister pad 108 removes the water from the air stream before it enters the housing of fan 36 and is exhausted to the atmosphere. Similar to scurbber pad 106, demister pad 108 is formed by upper and lower perforated polypropylene support grates 122 and 124, and an intermediate filter bed 126 of microreticulated polyester fibrous pellets which collect the water as the air passes therethrough.

For convenience, scrubber 30 also includes access doors 130, 132 and 134 which are constructed from clear PVC material. The doors are normally sealed against the scrubber walls, but are removable to provide access to pads 106 and 108 and the loer scrubber section 44.

It should be especially noted that during operation of scrubber 30, the only fresh water added to bath L is derived from the fresh water spray assemblies 48, 114 and 118. In effect, therefore, the spray assemblies perform the dual function of scrubbing the air and also supplying fresh makeup water to bath L. As described previously, the level of bath L is controlled by the overflow pipe elbow 90 and piping assembly 86.

From the description hereinabove, it is apparent that the method and apparatus of the invention accomplish the objects and advantages set forth initially by cleaning polluted air, particularly air from a glass coating station, with a high degree of efficiency sufficient to meet industrial and governmental standards and to overcome a problem not solvable by known commercial scrubbing systems.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of cleaning a hot polluted gas comprising spraying a liquid into the hot gas to rapidly cool the gas, passing the cooled gas into a first scrubbing stage in which the gas is directed through the upper portion of a liquid bath and is vigorously mixed with liquid from the bath as it flows through a tortuous, scroll type passageway, with at least some of the pollutants and liquids entrained in the gas separating from the gas and falling into the bath as the gas leaves the scroll type passageway, then passing the gas through a second scrubbing stage formed by a scrubber pad which intersects the flow path of the gas, and continously wetting the scrubber pad to enhance separation of the remaining pollutants from the gas as it passes through the pad.

2. A method as defined in claim 1, comprising passing the gas leaving the second scrubbing stage through a demisting stage wherein liquid is removed from the gas before it exits from the scrubbing apparatus.

3. A method as defined in claim 1, comprising directing the gas through openings in an orifice deflector plate which intersects the scroll type passageway, wherein the openings in the deflector plate create a venturi effect on the gas as it passes therethrough and the plate deflects at least some of the contaminants from the gas.

4. A method as defined in claim 1, comprising maintaining the liquid bath at a preselected level.

5. A method as defined in claim 1, wherein the gas leaving the scroll type passageway passes vertically upwardly through the flow intersecting scrubber pad of the second scrubbing stage, and wherein a wetting liquid is sprayed continuously against the bottom of the scrubber pad.

6. A method as defined in claim 5, comprising directing the gas through openings in an orifice deflector plate which intersects the scroll type passageway, wherein the openings in the deflector plate create a venturi effect on the gas as it passes therethrough and the plate deflects at least some of the contaminants from the gas.

7. A method as defined in claim 6, comprising maintaining the liquid bath at a preselected level.

8. A method as defined in claim 1, comprising adding a wetting agent to said liquid bath.

9. A method as defined in claim 8, comprising adding a defoaming agent to said liquid bath.

10. Gas scrubbing apparatus comprising wall means defining a vertical chamber having upper and lower sections; blower means mounted in said upper section; a liquid bath provided in said lower section; gas inlet duct means connected to said lower section for introducing polluted gas into said lower section; a gas cooling spray assembly mounted on said inlet duct means to rapidly cool the gas before it enters said lower section of said chamber; a scroll type baffle assembly mounted in said lower section adjacent said inlet duct means and said liquid bath to direct the gas from said inlet duct means through an upper portion of said bath and thereafter cause the gas and liquid entrained therein to flow through a scroll type, tortuous path to separate at least some of the pollutants from said gas; means for supplying additives to said lower section to enhance the scrubbing action of said bath and scroll assembly on said gas; a scrubber pad mounted in said upper section and intersecting the flow path of the gas; liquid spray means for continuously wettng said scrubber pad during passage of said gas through said pad; and means for maintaining said liquid bath at a preselected level.

11. Gas scrubbing apparatus as defined in claim 10, comprising a demisting pad mounted in said upper section above said scrubber pad, said demisting pad removing liquid from the clean gas before it is exhausted from the scrubbing apparatus by way of said blower means.

12. Gas scrubbing apparatus as defined in claim 10, said liquid spray means comprising a spray assembly mounted beneath said scrubber pad and having a plurality of nozzles for directing a spray of liquid upwardly against the bottom of said scrubber pad, the liquid from said spray nozzles also serving as a liquid supply source for said liquid bath.

13. Gas scrubbing apparatus as defined in claim 12, said liquid spray means also including a liquid spray assembly mounted above said scrubber pad for directing a liquid spray downwardly against the top of said scrubber pad.

14. Gas scrubbing apparatus as defined in claim 13, wherein said spray nozzle assemblies direct fresh water against said scrubber pad, the fresh water also serves as a fresh water makeup source for the liquid bath in said lower section.

15. Gas scrubbing apparatus as defined in claim 10, wherein said wall means includes an acid resistant, plastic material defining said vertical chamber, and said baffle assembly includes a plurality of baffle members constructed of acid resistant plastic material, one of said baffle members extending vertically within said lower section opposite said inlet duct means, a heat shield mounted on said one baffle member in facing relationship to said inlet duct means so that a hot gas introduced through said inlet duct means will engage said heat shield and be deflected downwardly into said liquid bath.

16. Gas scrubbing apparatus as defined in claim 15, said heat shield being loosely mounted on said one baffle member to permit expansion and contraction of the heat shield under varying temperature conditions.

17. Gas scrubbing apparatus as defined in claim 16, wherein said baffle members are constructed of polyvinylchloride plastic material and said heat shield is constructed of polypropylene plastic material.

18. Gas scrubbing apparatus as defined in claim 10, said baffle assembly including orifice deflector plate means intersecting said scroll type path and including a plurality of openings through which the gas may flow.

19. Gas scrubbing apparatus as defined in claim 18, said orifice plate means comprising a pair of spaced deflector plates, each having a plurality of openings, the openings in one of the plates being offset from alignment with the openings in the other plate.

20. Gas scrubbing apparatus as defined in claim 10, wherein said inlet duct means is inclined downwardly toward a lower section so that the liquid from said gas cooling spray assembly flows into the liquid bath in said lower section.

21. Gas scrubbing apparatus as defined in claim 20, wherein said gas cooling spray assembly includes a plurality of spaced apart spray nozzles, at least some of said spray nozzles being axially spaced apart and at least some of said spray nozzles being circumferentially spaced apart around said inlet duct means to provide a rapid, progressive cooling action on the gas passing through said inlet duct means.

22. Gas scrubbing apparatus as defined in claim 10, wherein said means for maintaining said bath at a preselected level comprises a drain pipe assembly having a conduit extending through a wall of said lower section, and overflow means adjustably connected to the inner end of said conduit within said lower section to selectively establish the operating level of said liquid bath.

23. Gas scrubbing apparatus as defined in claim 22, wherein said overflow means comprise a pipe elbow rotatably connected to the inner end of said conduit and being adjustable so that its open end establishes the overflow level of said bath.

24. Gas scrubbing apparatus comprising wall means defining a chamber; blower means mounted in said chamber for moving gas therethrough; a liquid bath provided in said chamber; inlet duct means connected to said wall means for introducing gas into said chamber; and a scroll type baffle assembly mounted in said chamber adjacent said inlet duct means and said liquid bath to direct the gas from said inlet duct means through an upper portion of said bath and thereafter cause the gas and liquid entrained therein to flow through a scroll type, tortuous path to separate at least some of the pollutants from said gas; said scroll type baffle assembly including orifice deflector plate means intersection said scroll type path comprising a pair of spaced deflector plates, each having a plurality of openings through which the gas may flow, with the openings in one of the plates being offset from the openings in the other plate.

25. Gas scrubbing apparatus as defined in claim 24, said wall means defining said chamber being constructed of an acid resistant plastic material, said baffle assembly including a plurality of baffle members constructed of acid resistant plastic material, one of said baffle members extending vertically within said chamber opposite said inlet duct means, a heat shield mounted on said one baffle member in facing relationship to said inlet duct means so that a hot polluted gas introduced through said inlet duct means will engage said heat shield and be deflected downwardly into said liquid bath.

26. Gas scrubbing apparatus as defined in claim 25, said heat shield being loosely mounted on said one baffle member to permit expansion and contraction of said heat shield under varying temperature conditions.

27. Gas scrubbing apparatus as defined in claim 26, wherein said baffle members and said orifice deflector plates are constructed of polyvinylchloride plastic material and said heat shield is constructed of polypropylene plastic material.

28. Gas scrubbing apparatus as defined in claim 25, comprising gas cooling spray means mounted on said inlet duct means to rapidly cool the gas before it enters said chamber.

29. Gas scrubbing apparatus as defined in claim 28, said gas cooling spray means including a plurality of spaced apart, fresh water spray nozzles, at least some of said spray nozzles being circumferentially spaced apart around said inlet duct means to rapidly cool the gas, said inlet duct means being inclined downwardly toward said chambr so that the fresh water from said nozzles will flow into said chamber and act as a fresh water supply source for said liquid bath.

30. Gas scrubbing apparatus comprising wall means defining a vertical chamber having upper and lower sections; blower means mounted in said upper section; a liquid bath provided in said lower section; gas inlet duct means connected to and inclined downwardly toward said lower section for introducing polluted gas into said lower section; a scroll type baffle assembly mounted in said lower section adjacent said inlet duct means and said liquid bath to direct the polluted gas from said inlet means through an upper portion of said bath and thereafter cause the gas and liquid entrained therein to flow through a scroll type tortuous path to separate at least some of the pollutants from said gas; means for supplying additives to said lower section to enhance the scrubbing action of said bath and scroll assembly on said gas; said baffle assembly including orifice deflector plate means intersecting the scroll type path and having a plurality of openings through which the gas may flow; means connected to said lower section for maintaining said liquid bath at a preselected level; a gas cooling fresh water spray assembly mounted on said inlet duct means to rapidly cool the gas before it enters said lower section; a scrubber pad mounted in said upper section and intersecting the flow path of the gas; fresh water spray means comprising spray nozzles mounted above and below said scrubber pad for continuously wetting said scrubber pad during passage of said gas through the pad; and a demister pad mounted in said upper section for removing water from the clean air before it is exhausted from said scrubbing apparatus by way of said blower means.

31. Gas scrubbing apparatus as defined in claim 30, wherein said wall means and said baffle means are constructed from acid resistant plastic material, and said baffle means includes a vertical baffle member extending vertically within said lower section opposite said gas inlet duct means, and a heat sield is mounted on said one baffle member in facing relationship to said inlet duct means to deflect the gas entering said lower section downwardly into said liquid bath.

32. Gas scrubbing apparatus as defined in claim 31, wherein said heat shield is loosely mounted on said vertical baffle member to permit expansion and contraction of said heat shield under varying temperature conditions.

33. Gas scrubbing apparatus as defined in claim 31, wherein said wall means and said baffle means are constructed of polyvinylchloride plastic material, and said heat shield is constructed of polypropylene plastic material.

34. Gas scrubbing apparatus as defined in claim 33, said inlet duct means comprising a first inlet duct connected at its inner end to said wall means and constructed of polyvinylchloride plastic material, and a second corrosion resistant metal spray duct connected to the outer end of said first duct, said fresh water spray assembly being mounted on said spray duct.

35. A gas cleaning system particularly useful for removing pollutants from a gas exhausted from a glass coating station at which a substance such as stannic chloride is deposited on glass articles to form a coating thereon and some of the substance is carried off as one of the pollutants in the exhaust gas, comprising gas collection means for collecting the polluted exhaust gas from said coating station, gas scrubbing apparatus having blower means, conduit means connecting said collection means to said scrubbing apparatus, said blower means drawing said gas from said coating station through said collection means and conduit means into said scrubbing apparatus, heating means associated with said collection means for heating the exhaust gas, first liquid spray means mounted on said conduit means adjacent said scrubbing apparatus and introducing a cooling liquid into said gas prior to entry of said gas into said scrubbing apparatus, said scrubbing apparatus comprising a vertical chamber having upper and lower sections, said blower means being mounted in said upper section, a liquid bath provided in said lower section, gas inlet duct means connected to said lower section for introducing the polluted gas from said conduit means into said lower section, a scroll type baffle assembly mounted in said lower section adjacent said inlet duct means and said liquid bath to direct the gas from said inlet duct means through an upper portion of said bath and thereafter cause the gas and liquid entrained therein to flow through a scroll type tortuous path to separate at least some of the pollutants from the gas, means for supplying additives to said lower section to enhance the scrubbing action of said bath and scroll assembly on said gas, a scrubber pad mounted in said upper section and intersecting the flow path of the gas, and second liquid spray means for continuously wetting said scrubber pad during passage of said gas through the pad.

36. A gas cleaning system as defined in claim 35, said gas collection means comprising a hood through which the glass articles pass as they are coated, said hood having open ends through which air enters and an outlet duct through which polluted gas is exhausted, a gas collection duct connected at one end to said conduit means and having a fitting on its other end which is spaced from and adjustable relative to said hood outlet duct to vary the airflow through said hood, and said heating means including a gas burner mounted on said gas collection duct.

37. A gas cleaning system as defined in claim 35, said heating means comprising a gas burner which produces a temperature sufficient to convert the stannic chloride substance to stannic oxide particles and hydrogen chloride gas.

38. A gas cleaning system as defined in claim 35, said scrubbing apparatus further comprising a demister pad mounted in said upper section above said scrubber pad, said demister pad removing liquid from the clean gas before it is exhausted from said scrubbing apparatus.

39. A gas cleaning system as defined in claim 35, wherein said first liquid spray means comprises a spray assembly connected to said inlet duct means for rapidly cooling said gas immediately before it enters said lower section.

40. A gas cleaning system as defined in claim 39, wherein said inlet duct means is inclined downwardly toward said lower section so that the liquid from said first liquid spray means flows into the bath in said lower section.

41. A gas cleaning system as defined in claim 39, wherein said first liquid spray means comprises a plurality of spaced apart spray nozzles mounted on said inlet duct means, at least some of said spray nozzles being axially spaced apart and at least some of said spray nozzles being circumferentially spaced apart around said inlet duct means to provide a rapid progressive cooling action on said polluted gas.

42. A gas cleaning system as defined in claim 39, wherein the liquid from said first and second spray means is fresh water which collects in said lower section and serves as makeup water for said bath, and wherein said apparatus further includes means for maintaining said bath at a preselected level.

43. A gas cleaning system as defined in claim 35, wherein the walls of said chamber are constructed from an acid resistant plastic material and said baffle assembly includes a plurality of baffle members of acid resistant plastic material, one of said baffle members extending vertically within said lower section opposite said inlet duct means, a heat shield mounted on said one baffle member in facing relationship with said inlet duct means so that the gas introduced said inlet duct means engages said hat shield and is deflected downwardly into said liquid bath.

44. A gas cleaning system as defined in claim 43, said heat shield being loosely mounted on said one baffle member to permit expansion and contraction of said heat shield under varying temperature conditions.

45. A gas cleaning system as defined in claim 44, wherein said baffle members are constructed of polyvinylchloride plastic material and said heat shield is constructed of polypropylene plastic material.

46. A gas cleaning system as defined in claim 35, said baffle assembly including orifice deflector plate means intersecting said scroll type path and including a plurality of openings through which the gas may flow.

47. A gas cleaning system as defined in claim 46, said orifice plate means comprising a pair of spaced deflector plates each having a plurality of openings in the other plate.

48. A gas cleaning system as defined in claim 35, said second liquid spray means being mounted below said scrubber pad and including nozzle means for continuously directing liquid upwardly against the bottom of said scrubber pad.

49. A gas cleaning system as defined in claim 48, said scrubbing apparatus further comprising third liquid spray means mounted above said scrubber pad and including nozzle means for continuously directing liquid downwardly against the top of said scrubber pad.

50. A gas cleaning system as defined in claim 49, wherein said second and third liquid spray means spray fresh water against said scrubber pad.

51. The gas cleaning system as defined in claim 49, said scrubbing apparatus further comprising a demister pad mounted in said upper section above said third spray means, said demister pad removing liquid from the clean gas before it is exhausted from said scrubbing apparatus.

* * * * *

UNITED STATES PATENT OFFICE
CERTIFICATE OF CORRECTION

PATENT NO. : 3,885,929
DATED : May 27, 1975
INVENTOR(S) : Richard S. Lyon et al

It is certified that error appears in the above-identified patent and that said Letters Patent are hereby corrected as shown below:

Delete from the title "AND APPARATUS".

Col. 1, line 25, change "complete" to --compete--.

Col. 1, line 34, change "stoppage" to --stoppages--.

Col. 1, line 64, change "precent" to --percent--.

Col. 2, line 13, change "hydrocchloric" to --hydrochloric--.

Col. 2, line 19, change "formula" to --formation--.

Col. 2, line 34, change "ivention" to --invention--.

Col. 4, line 7, change "sectioanl" to --sectional--.

Col. 4, line 13, change "referred" to --referring--.

Col. 4, line 27, change "comprise" to --comprises--.

Col. 4, line 51, change "variagle" to --variable--.

Col. 4, line 51, change "fittings" to --fitting--.

Col. 4, line 59, change "postioned" to --positioned--.

Col. 4, line 63, change "it" to --It--.

Col. 5, line 3, change "aggiomerate" to --agglomerate--.

Col. 5, line 9, change "initiat" to --initiate--.

Col. 7, line 12, change "passagee" to --passage--.

UNITED STATES PATENT OFFICE
CERTIFICATE OF CORRECTION

PATENT NO. : 3,885,929
DATED : May 27, 1975
INVENTOR(S) : Richard S. Lyon et al

It is certified that error appears in the above-identified patent and that said Letters Patent are hereby corrected as shown below:

Col. 7, lines 54 and 55, change "maintainingg" to --maintaining--.

Col. 8, line 15, change "through" to --thought--.

Col. 8, line 25, change "improves" to --improve--.

Col. 8, line 60, change "scurbber" to --scrubber--.

Col. 9, line 3, change "loer" to --lower--.

Col. 9, line 27, delete "We claim:" and insert --What is claimed and desired to be secured by Letters Patent is:--.

Col. 10, claim 10, line 29, change "wettng" to --wetting--.

Col. 10, claim 14, line 53, change "serves" to --serving--

Col. 11, claim 24, line 57, change "intersection" to --intersecting--.

Col. 12, claim 29, line 23, after "nozzles" insert --being axially spaced apart and at least some of said spray nozzles--.

Col. 12, claim 31, line 65, change "sield" to --shield--.

Col. 14, claim 43, line 43, after "introduced" insert --through--.

Col. 14, claim 43, line 44, change "hat" to --heat--.

Col. 14, claim 47, line 60, after "openings" insert

Page 3

UNITED STATES PATENT AND TRADEMARK OFFICE
CERTIFICATE OF CORRECTION

PATENT NO. : 3,885,929
DATED : May 27, 1975
INVENTOR(S) : Richard S. Lyon et al

It is certified that error appears in the above-identified patent and that said Letters Patent are hereby corrected as shown below:

--, with the openings in one of the plates being offset from the openings--.

*Signed and Sealed this*

*seventh* Day of *October 1975*

[SEAL]

Attest:

RUTH C. MASON
*Attesting Officer*

C. MARSHALL DANN
*Commissioner of Patents and Trademarks*